March 11, 1958 J. R. FULLERTON ET AL 2,826,675
METHOD FOR INSTALLING FITTINGS IN METAL
CELLULAR CORE PANELS
Filed March 29, 1956 2 Sheets-Sheet 1

INVENTORS.
JOHN R. FULLERTON
LAWRENCE E. LEECH
DONALD L. HEYSER

BY
Knox & Knox

March 11, 1958   J. R. FULLERTON ET AL   2,826,675
METHOD FOR INSTALLING FITTINGS IN METAL
CELLULAR CORE PANELS
Filed March 29, 1956   2 Sheets-Sheet 2

INVENTOR
JOHN R. FULLERTON
LAWRENCE E. LEECH
DONALD L. HEYSER

BY Knox & Knox

United States Patent Office 2,826,675
Patented Mar. 11, 1958

2,826,675

METHOD FOR INSTALLING FITTINGS IN METAL CELLULAR CORE PANELS

John R. Fullerton, Lawrence E. Leech, and Donald L. Heyser, San Diego, Calif., assignors to The Ryan Aeronautical Co., San Diego, Calif., a corporation of California Application March 29, 1956, Serial No. 574,683

4 Claims. (Cl. 219—117)

The present invention relates generally to cellular core structural panels and more particularly to a method for installing fittings in metal cellular core panels.

The primary object of this invention is to provide a method by which rigid fittings may be welded into metal cellular core panels in such a manner that stresses applied to the fittings are evenly distributed to all surrounding structure of the panel.

Another object of this invention is to provide a method by which large fittings can be welded into cellular core panels of very thin material where the thickness ratio of the fitting to the panel material may be several hundred to one or even several thousand to one.

Another object of this invention is to provide a method by which the fittings may be installed without burning or distortion of the thin material of the panel.

Another object of this invention is to provide a method which enables the outer skins of the panel to be secured firmly to the core and to the fittings without burning or distortion.

Finally, it is an object to provide a method which is simple, safe and convenient to use and which will produce accurate and structurally rigid panel assemblies.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 1:
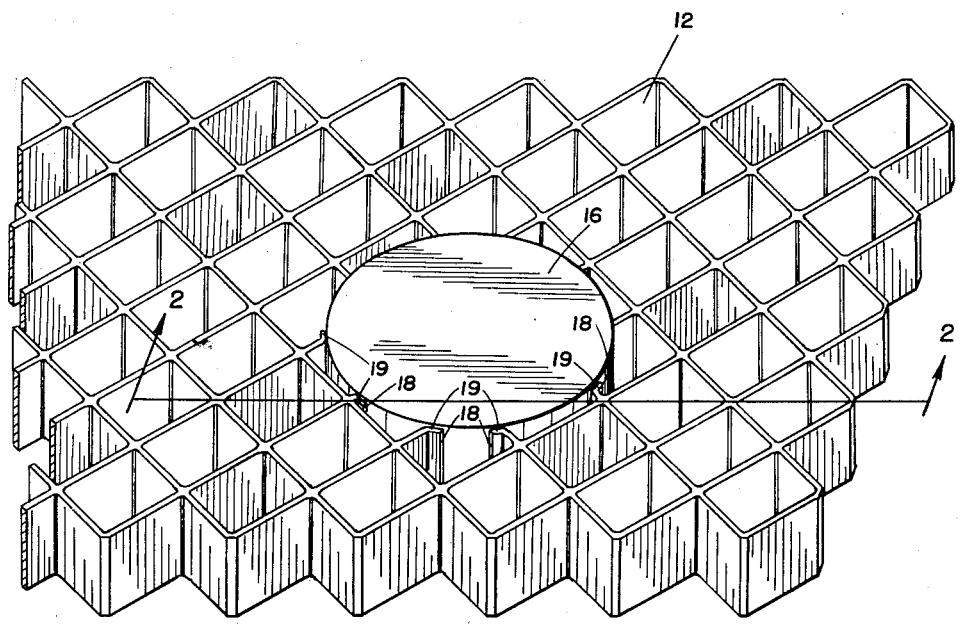
Fig. 1 is a perspective view of a portion of a cellular core showing a fitting in place.

Referring now to Figs. 1–4 of the drawings, the panel 10 comprises a metal cellular core 12 of any desired configuration which is enclosed on both sides by thin sheet metal skins 14, the structure of such a panel being well known. While such a panel is extremely rigid as a structural unit the structure does not lend itself to the support of heavy loads applied to a small area thereof.

This problem is well illustrated by the use of these cellular core panels in an aircraft, the panels being used for cabin floors, wall elements, or even outer shell portions of the fuselage. Since many instruments, accessories, seats or other apparatus must be mounted on these portions of the aircraft some means must be provided to stress the panels at the points of attachment, since the skins 14 themselves are not sufficiently rigid to do this. The necessary rigidity may be provided by a solid fitting, such as the fitting 16, which is inset in the core 12 and securely bonded to the core and to the skins 14 so that loads are evenly distributed to a large portion of the panel 10.

The fittings may take many forms, such as blocks, channel members or the like, of various sizes and shapes, according to specific needs. For purposes of illustration the fitting 16 is shown as a simple disc shaped block. Various pieces of apparatus can be attached to the fitting 16 by bolting directly to the fitting, or to a bracket or the like secured to the fitting.

The core 12 is prepared by first cutting an aperture through the core, the aperture being cut slightly smaller than the fitting 16, and all the cut ends 18 are bent to provide flanges 19. The fitting 16 is then placed in the aperture and secured so that all the flanges 19 are in contact with the outer edge of the fitting. Each flange 19 is then welded to the fitting 16 using a suitable electrode 20 held in an electrode holder 22, which is connected to a resistance welding machine such as that shown diagrammatically in Figure 2, the general arrangement of this type of machine being well known. This type of welding machine is used both for welding the fitting to the core and for welding the skins in place, as will later be explained. The welding machine includes a transformer 24 having a secondary winding 26 to one side of which the electrode 20 is connected. The other side of the secondary winding 26 is connected to the core 12. The primary winding 28 of the transformer 24 is connected to a charging unit 30 which contains rectifiers and condensers to accumulate a heavy charge of welding current. The apparatus is designed so that the welding current can be applied, through discharge of the condensers, as a pulse of extremely short duration, such as a few milliseconds, the pulses being controlled by a suitable timer 32. The welding current is of low voltage and high amperage and would normally cause burning and distortion of the thin metal of the core 12. However, the extremely short pulse of current makes an effective weld without allowing an excessive build up of heat at the joint. A few milliseconds duration of pulse is considerably shorter than the welding current pulse normally used in such apparatus, and it is this short pulse that makes possible the welding of materials such as the thin core 12 and the thick fitting 16. Parts having thickness ratios of several hundred to one and even several thousand to one have been successfully welded by this method, as opposed to the usual ratio of 4 to 1 or thereabouts. With the fitting 16 welded securely to each flange 19, loads are thus distributed evenly from the fitting to the core structure.

Figure 3:
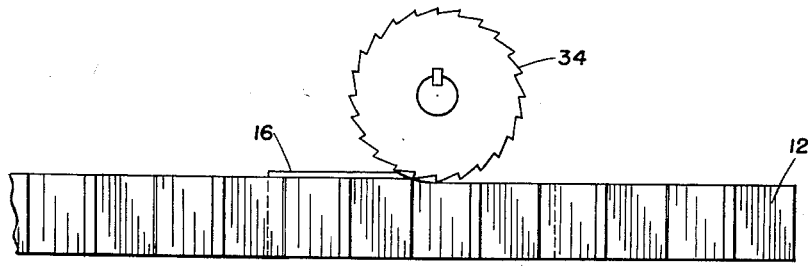
Fig. 3 is a side elevation view of the core and fitting showing the method of preparing this portion for attachment of the outer skins.

The assembly of core 12 and fitting 16 is next prepared for attachment of the skins 14 by machining the surfaces with a suitable milling cutter 34, or the like, as in Figure 3. By utilizing this machining step the welding of the fitting 16 in the core 12 is greatly simplified, since the fitting need not be aligned within precise limits.

Figure 2:
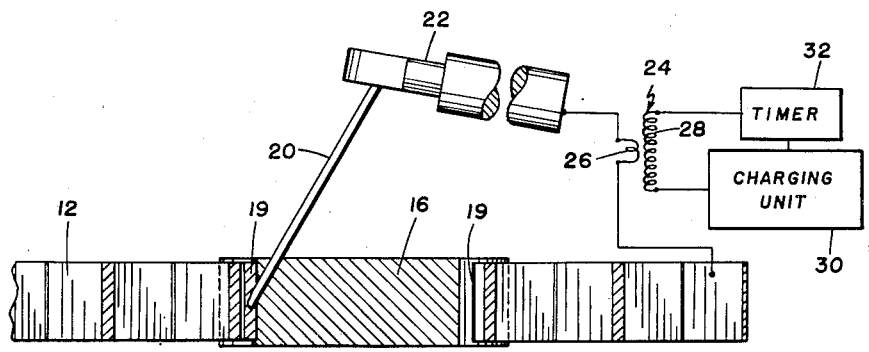
Fig. 2 is a sectional view taken on the line 2—2 of Fig. 1 showing the method of securing the fitting to the core.
Figure 4:
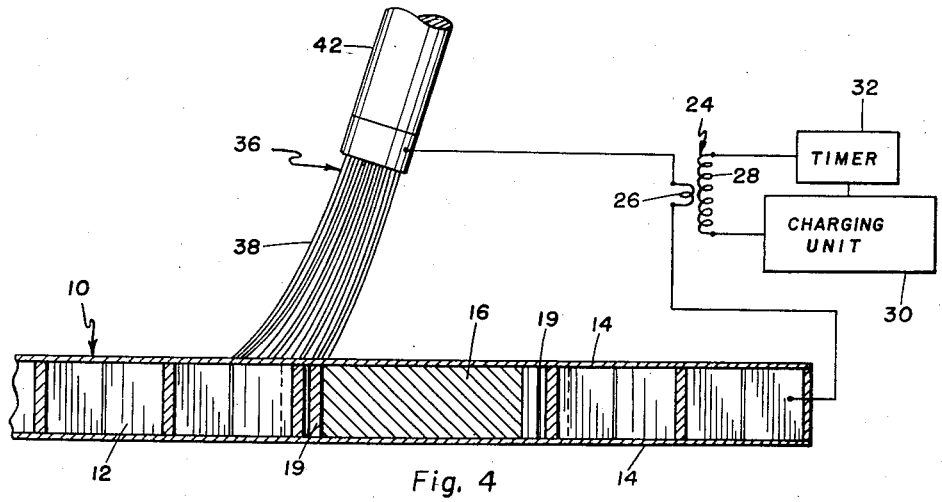
Fig. 4 is a sectional view similar to Fig. 2 showing the method of attaching the skins.

After machining the skins 14 are welded to the core 12 and fitting 16 by the apparatus shown in Figure 4. This apparatus is as shown in Figure 2 except that a brush electrode 36 is used to apply the welding current to the skins. This brush electrode 36 comprises a plurality of thin, flexible wires or bristles 38 secured together at one end to form a brush. The brush may be fitted with a handle 42 for manual use or may be designed for attachment to an automatic welding machine. The brush electrode 36 is connected to one side of the secondary winding 26 and the other side of the winding is connected to the core 12.

The welding is accomplished by drawing the brush electrode 36 across the skin 14 in firm frictional contact therewith, while holding the skin firmly against the core 12 by means of suitable clamps or the like. The welding current is distributed through the wires 38 to a large number of contact points each of small area, instead of being concentrated in one fairly small area as with other types of electrodes. This distribution of current together with the extremely short pulse character of current, effectively prevents burning and distortion of the skins 14, while still providing sufficient local heat to make a complete weld. It has been found in practice that the skins are firmly bonded to both the core 12 and fittings 16 by this method, so that loads imposed on the fittings are absorbed by the entire structure of the panel. To ensure even welding, the brush electrode 36 is preferably moved in a predetermined pattern, such as straight parallel strokes, to cover the areas to be welded.

Figure 5:
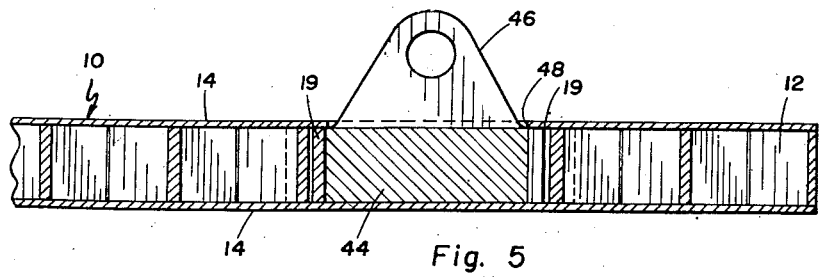
Fig. 5 is a sectional view similar to Fig. 2 showing a panel having a fitting which extends through one skin.

This type of welding has a further advantage in that the surfaces of the panels need not be flush. For certain structures it may be necessary to install a fitting which protrudes from one side of the panel 10, as in Fig. 5. In this particular structure the fitting 44 has an extended lug 46 to which various apparatus or instruments may be attached, and an opening 48 of suitable size is cut in one skin 14 to clear the lug. The structure is otherwise assembled in the manner described above. Using the brush electrode 36 the skin 14 is easily welded to the fitting 44 and core 12 around the opening 48, such an operation being virtually impossible with the roller type electrodes normally used.

It will be evident that many types of fittings may be installed in cellular panels for many different uses by the instant method. The fittings are bonded to the core and skins of the panels so that stresses are distributed throughout the entire structure. By using extremely short pulses of welding current, burning and distortion of the panel is avoided and large fittings may be safely welded to very thin skins and cores.

The panels thus constructed are suitable for many purposes such as wall elements, floor panels, or doors, the latter utilizing the internal fittings as reinforcements at the hinge and lock attachment points. Further, the panels may be flat or curved and the fittings shaped to suit the actual surface contours not being unduly limited.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

We claim:

1. A method for installing fittings in metal cellular core panels, comprising: cutting an opening in a cellular metal core corresponding closely to the shape of the fitting to be place therein; inserting the fitting in the opening and welding the cut end portions of the core to the fitting; welding outer metal skins to both sides of the core and to the fitting so that the fitting is securely bonded to both the core and the skins; the welding being accomplished by short pulses of welding current each having a duration on the order of a few milliseconds.

2. A method for installing fittings in metal cellular core panels, comprising: cutting an opening in a cellular metal core corresponding closely to the shape of the fitting to be placed therein; inserting the fitting in the opening and welding the cut end portions of the core to the fitting; welding outer metal skins to both sides of the core and to the fitting so that the fitting is securely bonded to both the core and the skins; the skins being welded by means of a flexible brush type electrode moved over the surface of each skin in firm frictional contact therewith; the welding being accomplished by short pulses of welding current each having a duration on the order of a few milliseconds.

3. A method for installing fittings in metal cellular core panels, comprising: cutting an opening in a cellular metal core corresponding closely to the shape of the fitting to be placed therein; inserting the fitting in the opening and welding the cut end portions of the core to the fitting; machining both sides of the core and fitting to the finished surface contours; welding outer metal skins to both sides of the core and to the fittings so that the fitting is securely bonded to both the core and the skins; the skins being welded by means of a flexible brush type electrode moved over the surface of each skin in firm frictional contact therewith; the welding being accomplished by short pulses of welding current each having a duration on the order of a few milliseconds.

4. A method for installing fittings in metal cellular core panels, comprising: cutting an opening in a cellular metal core corresponding closely to the shape of the fitting to be placed therein; inserting the fitting in the opening and welding each cut end portion of the core to the fitting individually using short pulses of welding current each having a duration on the order of a few milliseconds; machining both sides of the core and fitting to the finished surface contours; welding outer metal skins to the core and the fitting using a flexible brush type electrode moved over the entire surface of the skins in firm frictional contact therewith, so that the fitting is securely bonded to both the core and the skins, using short pulses of welding current each having a duration on the order of a few milliseconds.

References Cited in the file of this patent

UNITED STATES PATENTS

| | | |
|---|---|---|
| 1,717,779 | Hume | June 18, 1929 |
| 2,056,563 | Budd et al. | Oct. 6, 1936 |
| 2,108,795 | Budd | Feb. 22, 1938 |
| 2,365,539 | Flowers | Dec. 19, 1944 |